United States Patent [19]

Kurz

[11] Patent Number: 5,073,198

[45] Date of Patent: Dec. 17, 1991

[54] METHOD OF PREPARING BUILDING MATERIALS

[76] Inventor: Fredrik W. A. Kurz, Nysatravagen 12, S-181 61 Lindingo, Sweden

[21] Appl. No.: 565,246

[22] Filed: Aug. 9, 1990

Related U.S. Application Data

[63] Continuation-in-part of Ser. No. 344,208, Apr. 27, 1989, abandoned, which is a continuation-in-part of Ser. No. 71,794, filed as PCT/SE 86/00473, Oct. 14, 1986, abandoned.

[30] Foreign Application Priority Data

Oct. 14, 1985 [SE] Sweden ............................ 8504754

[51] Int. Cl.$^5$ ........................................... C04B 7/153
[52] U.S. Cl. ................................. 106/791; 106/789; 106/790; 106/801; 106/690; 106/691
[58] Field of Search ............... 106/789, 790, 791, 801, 106/690, 691

[56] References Cited

FOREIGN PATENT DOCUMENTS

| | | | |
|---|---|---|---|
| 272267 | 2/1991 | European Pat. Off. | |
| 54-099126 | 8/1979 | Japan | 106/789 |
| 55-080747 | 6/1980 | Japan | 106/789 |
| 58-140356 | 8/1983 | Japan | 106/789 |
| 00473 | 4/1987 | PCT Int'l Appl. | |
| 0663678 | 5/1979 | U.S.S.R. | 106/789 |
| 0718396 | 3/1980 | U.S.S.R. | 106/789 |
| 0808461 | 2/1981 | U.S.S.R. | 106/789 |

Primary Examiner—Karl Group
Assistant Examiner—Anthony J. Green
Attorney, Agent, or Firm—Ladas & Parry

[57] ABSTRACT

An improved method of making a building material comprising activating slag with an activator of Portland cement, an acidic component and a basic component. The acidic component is a phosphate or a mixture of phosphates in an amount of 2 to 40% by weight based on the amount of the slag and activator, which serve as binding agents. The phosphate or mixture of phosphates have surface tension reducing action or a detergent or mixture of detergents is added to the binding agents in an amount of 0.1 to 2% by weight of the binding agents. The basic component is present in an amount of 2 to 20% by weight based on the amount of the binding agents. The basic component is magnesium oxide, or magnesium oxide in combination with earth metal oxides selected from the group consisting of calcium oxide, aluminum oxide, titanium oxide, zirconium oxide, and zinc oxide, with the amount of calcium oxide not exceeding 3% by weight based on the slag. The Portland cement is present in an amount effective to increase the mechanical strength of the building material but not exceeding 40% by weight based on the slag. The concentration of lime in the slag and of calcium in the activator is such that the building material has a sufficiently low calcium content whereby substantially to preclude carbonation within the building material.

15 Claims, No Drawings

METHOD OF PREPARING BUILDING MATERIALS

This is a continuation-in-part of Ser. No. 07/344,208 filed Apr. 27, 1989, now abandoned which is a continuation-in-part of Ser. No. 07/071,794, filed as PCT SE86/00473, Oct. 14, 1986, now abandoned.

BACKGROUND OF THE INVENTION

The present invention relates to a method of making a building material by activation of latently hydraulic finely ground granulated amorphous basic blast-furnace slag to form a direct acting hydraulic binder, wherein a concrete having great mechanical strength and high chemical resistance is formed. More particularly the present invention relates to a novel activator for a latently hydraulic ground granulated blast-furnace slag and a method for producing said activator.

It is well known that a concrete is formed upon mixing a hydraulic binder, water and aggregates, such as sand and gravel, in varying proportions. One condition is that the hydraulic binder must react chemically with water and, in combination with sand and gravel, produce a concrete of sufficient strength.

Portland cement is generally considered as the best hydraulic binder for mortar and concrete. It forms hardened concrete within a few hours, and the concrete formed obtains its ultimate strength within about one month. The setting and hardening is due mainly to chemical reactions between basic lime and silicic acid.

The hydration of portland cement starts almost instantly upon adding water. The alkali presented in the material activates the subsequent hydration of calcium silicates giving a cement gel, which is responsible for the concrete strength. But there is a main disadvantage in that portland cement develops much more lime hydrate, $Ca(OH)_2$, than the amount consumed by $SiO_2$. It has been established that portland cement during the hydration process produces about 0.3 kg $Ca(OH)_2$ per 1 kg portland cement. Said excess of $Ca(OH)_2$ was previously considered as an advantage of portland cement, because of the high pH-value of the concrete formed providing a good rust-proof of steel adhered to the concrete. But $Ca(OH)_2$ is an unstable and aggressive compound resulting for example in carbonation shrinkage and subsequent cracking of the concrete. The disadvantage of carbonation of concrete has recently been discussed in an article of M. Maage, Nordisk Betong No 2 (1987). It has been known for many years among scientists that carbon dioxide in the air reacts with the excess of $Ca(OH)_2$ in concrete and gives $CaCO_3$. Said reaction product, $CaCO_3$, has a smaller volume than the starting material and the decrease of volume results in shrinkage and cracking of the concrete. Further, carbonation results in a decreased pH-value and the concrete gives less rust-proof of steel adhered to said concrete.

An analysis of portland cement shows about 64% CaO, 20% $SiO_2$, 2.5% MgO, 6% $Al_2O_3$, 3.5% $Fe_2O_3$+FeO, 2% $K_2O$+$Na_2O$, 1.5% $SO_3$. The high lime content of portland cement also results in a concrete with limited chemical resistance, which can be seen for example by the fact that concrete pavements are destroyed by road salts, concrete bridges and off shore constructions are destroyed by sea-water and steel adhered to concrete is rusting. A further disadvantage is the fact that portland cement during initial hydration causes a temperature increase, to temperatures over 50° C. Therefore concrete constructions of a thickness over 0.4 m will show deformations and general cracks, because of thermal stress. Different attempts to solve these problems have been proposed, but none of these give a reliable solution. A further disadvantage is that concrete of portland cement is not fire-resistant and cannot withstand temperature over 500° C. The excess of $Ca(OH)_2$ in said concrete decomposes to CaO and $H_2O$ at temperatures of 325°-400° C. resulting in shrinkage, increased porosity and decomposition.

It is an object of the present invention to provide a method of making a building material, which material does not show the disadvantages of portland cement mentioned above. The main disadvantage of portland cement is the high calcium content and the fact that not all lime is bound in the hardened concrete. The excess of unstable lime hydrate, which is formed towards the later part of the setting and hardening process, can easily leach out from the concrete by water influence and carbon dioxide in the air, involving a risk of detrimental carbonation.

Measures were taken by the inventor to find a material having a similar composition as portland cement but with a lower calcium content. An analysis of ground granulated blast-furnace slag shows about 30 to 40% CaO, 35 to 40% $SiO_2$, 7 to 10% MgO, 10 to 20% $Al_2O_3$, 0.5 to 2% $Fe_2O_3$+FeO, 1 to 1,5% $K_2O$+$Na_2O$, 0.5 to 3% $SO_3$. These figures show that the lime content of slag is only about half the amount of portland cement, but the amounts of $SiO_2$, $Al_2O_3$ and MgO are much higher than in portland cement. These three substances are known to impart to silicates higher chemical and mechanical resistance, i.e. increasing compressive and tensile strength and resistance against chemical influence. From such glass technology it is known that chemical resistant glass such as Pyrex TM has a high content of $SiO_2$, i.e. more than 80% by weight compared to less than 15% by weight for conventional glass. But substances such as, for example, MgO cannot easily be incorporated in portland cement at low temperatures, it has to be melted into the material, which is difficult because magnesium oxide has a high melting point (2800° C.).

Blast-furnace slag is a nonmetallic product obtained in a molten condition simultaneously with iron in a blast furnace. The slag is considered as a useless residual product and is present in hundreds of millions of tons on an international basis. Granulated blast-furnace slag is the glassy granular material formed when molten blast-furnace slag is rapidly chilled, as by immersion in water or by a combination of cold water and cold air. The slag becomes glassy and amorphous by this process. After the granulated blast-furnace slag is formed, it must be dewatered, dried and ground. Typically, the slag is ground to an air-permeability (Blaine) fineness exceeding that of portland cement, to obtain increased activity at early ages. Typically blast-furnace slag has a fineness of 5000 Blaine ($cm^2/g$) and portland cement has a fineness of 3500 Blaine. As with portland cement the rate of reaction increases with the fineness of the material, but for slag in a still higher degree.

The granulated blast-furnace slag is only "latently" hydraulic, i.e. it is not a hydraulic binder, such as portland cement, which directly reacts upon adding water. Therefore the latently hydraulic slag requires admixing with an activator to start the hydration.

Many attempts for activation of blast-furnace slag have been made. The oldest patent is from 1892 (Passow), wherein a mixture of slag and portland cement in an amount of 1:1 is recommended. The lime hydrate, $Ca(OH)_2$, formed in the final stage of hydration of portland cement acts herewith as an activator for the slag. But in many countries this slag cement is hardly used at present, because the initial hydration of slag is slow giving a slow development of strength. Furthermore there is a rather great risk of carbonation shrinkage, because of an excess of lime hydrate in the concrete formed.

Further, alkali salts and sulfates can be mentioned as prior known activators for blast-furnace slag (see H Kühl, Zement-Chemie Berlin 1951). But these activators must be admixed in rather great amounts into the slag, resulting in a concrete product with a number of deficiencies. For example alkali salts such as NaOH and $Na_2CO_3$ must be admixed into the slag in an amount of at least 6% by weight based on the slag. But after activation the setting occurs mostly too rapidly, namely in about 10 to 30 minutes. This rapid setting and hardening makes casting in a building site impossible. Therefore, the use of alkali activated blast-furnace slag is limited to the manufacture of prefabricated components, such as precast concrete units. Further, the addition of caustic NaOH in an amount of at least 6% by weight is inappropriate for the chemical resistance of the product and there is a risk of microcracks. The other known activation method disclosing the use of sulfates as an activator for blast-furnace slag requires admixing of about 10% by weight sulfate into the slag, resulting in an insufficient initial strength and a risk of swelling and shrinkage. Activation by lime, as for example a 1:1 mixture of slag and portland cement, gives a slow reaction rate and the disadvantages mentioned above.

It is an object of the present invention to provide a novel activator, i.e. a novel activation system for a latently hydraulic finely ground granulated amorphous basic blast-furnace slag, which avoids the deficiencies of prior known activation systems. It is a further object to provide a method of making a building material by activation of latently hydraulic granulated blast-furnace slag to form a direct acting hydraulic binder, wherein a concrete having a low calcium content, great mechanical strength and high chemical resistance is formed.

DESCRIPTION OF THE INVENTION

The present invention provides a method of making a building material having a sufficiently low calcium content, whereby substantial carbonation within said building material is precluded.

An object of the invention discloses a method of making a building material comprising activation of a latently hydraulic finely ground granulated amorphous basic blast-furnace slag by a novel activator consisting of an acidic component and a basic component. More particularly the method of making a building material comprises activation of latently hydraulic finely ground granulated amorphous basic blast-furnace slag to form a direct acting hydraulic binder, by mixing said slag, water, sand and other aggregates, and an activator consisting of a combination of an acidic component and a basic component, wherein the acidic component is a phosphate or phosphates, in an amount of 2 to 40% by weight based on the amount of the slag, and the basic component is magnesium oxide, or magnesium oxide in combination with earth metal oxides and/or zinc oxide, said basic component being present in an amount of 2 to 20% by weight based on the amount of the slag, said acidic component further comprising including as the phosphate or phosphates a phosphate having surface tension reducing action or mixing the slag, sand and other aggregates, and activator with a surface tension reducing agent consisting of one or more detergents in an amount of 0.1 to 2% by weight based on the slag, wherein a concrete of great mechanical strength and high chemical resistance is formed without the need for heating at a high temperature. Alternatively the amount of basic component can be expressed as 0.3 to 3% by weight, based on the dry concrete (i.e. slag+sand+aggregate), and the amount of acidic component as 0.3 to 6% by weight based on the dry concrete, respectively. The building material is produced in the conventional manner by intensively mixing of the binding agents in an ordinary concrete mixer for a few minutes, aggregates (i.e. sand and gravel) are admixed into the mixer and thereafter water is added for further disintegration in combination with vibration. The mixing time depends on the amount of aggregate and the requested fluidity of the concrete. The mixing can be done either directly in the building site just before casting or in a batch plant for transport on lorries to the building site.

The ground granulated blast-furnace slag acts as the binding agent for the concrete, but slag being "latently" hydraulic requires admixing of an activator to start the hydration. One reason that the hydration of blast-furnace slag does not start upon admixing of water is that a dense gel rich in silicic acid is formed, said gel enclosing the slag grains and preventing hydration. Thus, the activation has a double purpose. Firstly the activators must break the gel and secondly they must react with the slag. However, it is to be mentioned that the gel formation has a positive effect on the concrete formed. The gel pores formed are uniformly distributed giving the slag concrete a better frost-proof as compared with the capillary pores formed in portland cement concrete, which do not give such a good frost-proof.

The grinding of the granulated blast-furnace slag has been found to be a determining factor of the activation. The rate of reaction increases with the fineness. To obtain a high early strength the granulated blast-furnace slag must be ground to a fineness of about 7,500 Blaine. Said fineness requires an extra grinding step, as typically ground granulated blast-furnace slag has a fineness of about 5,000 Blaine. Finely ground blast-furnace slag of 7,500 Blaine improves the mechanical strength at least two times, but the extra step of grinding is rather expensive. Therefore, a further object of the invention was to find a method to preclude said extra step of grinding.

Accordingly the invention further provides a method for activation of latently hydraulic granulated blast-furnace slag conventionally ground, which method does not need an extra step of grinding of the slag.

The initial hydration of blast-furnace slag is much slower than the hydration of portland cement. Portland cement reacts instantly upon adding water, firstly by the small amount of alkali in the starting material and secondly by $Ca(OH)_2$ formed subsequently during the hydration. These components are lacking in blast-furnace slag and, therefore a small amount of alkali, such as NaOH or KOH can be included in the binding agent. Said addition of alkali should be limited to 0.5–1.5% by weight based on the amount of the binding agents whereby any detrimental side actions on the concrete such as reduced chemical resistance is precluded. The combination of MgO and phosphate in the novel activator will also prevent the concrete from such optional side actions. The addition of the small quantity of NaOH has also the effect of a slight roughening of the surface of the slag granules, which enlarges the reactive area and therefore also the activation without damaging side effects, which happens with larger alkali-additions. The roughening of the surface forces also breaking up of the above mentioned silica-rich gel which gets stronger by aging of the ground slag.

In the prior known alkali method (discussed in the introductory part of the specification), the activation requires at least 6% by weight of NaOH, whereby a detrimental alkali-silica-reaction occurs. Said reaction comprises a release of $SiO_2$ from minerals containing amorphous silica by the alkali action. Said reaction causes expansion and microcracks. Thus, the high alkali amounts necessary for the activation causes a leaching of the slag. The small amount of alkali recommended in the present method of the invention (about 0.5–1.5% by weight) is so small that all is consumed during the first day of setting. A higher admixture of alkali gives a higher strength, but only for a limited time until the slag granules are affected, resulting in microcracks. On the other hand an admixture of amorphous silica consisting of pure $SiO_2$ has only a positive influence on the strength, because pure $SiO_2$ does not leach out. Furthermore, a small addition of CaO, preferably 1 to 3% by weight, especially about 1.2% by weight based on the amount of the slag, is admixed into the slag. The addition of CaO is so small that apatite formation does not occur. The addition of CaO will also be consumed by different reactions with MgO and silica. The increase of the basic component of the activator requires for chemical balance an increase of the acidic component of the activator, in the range of 1 to 2% by weight compared to the amounts used in the other method of the invention, i.e. activation of slag with MgO and phosphate.

The small addition of CaO is consumed initially in the hydration but it is suitable if some unbound calcium is presented during the whole hydration, which in most cases lasts about 28 days, and therefore it is favorable to combine the ground granulated blast-furnace slag with some portland cement to increase the reaction rate as well as to increase the 28-days compressive strength. The adding of portland cement shall not exceed 40% by weight of the slag, preferably portland cement can be present in an amount of 15 to 30% by weight, especially 20% by weight based on the slag. The adding of portland cement provides formation of a useful amount of $Ca(OH)_2$ during the whole hydration period without causing any detrimental carbonation. The adding of some portland cement into the slag also gives a slight heat development during the hydration. Said heat has a positive influence on the activation of the slag without causing any heat shrinkage. More particularly the latter object of the invention disclosed a method of making a building material wherein latently hydraulic ground granulated amorphous basic blast-furnace slag is activated to form a direct acting hydraulic binder, by mixing said slag, water, sand, and other aggregates, and an activator consisting of portland cement and a combination of an acidic component and a basic component, wherein the acidic component is a phosphate or phosphates, in an amount of 2 to 40% by weight based on the amount of the binding agents, and the basic component is magnesium oxide, or magnesium oxide in combination with earth metal oxides and/or zinc oxide, said basic component being present in an amount of 2 to 20% by weight based on the amount of binding agents, said acidic component further comprising including as the phosphate or phosphates a phosphate having surface tension reducing action or mixing the slag, sand and other aggregates, and activator with a surface tension reducing agent consisting of one or more detergents or nitrates in an amount of b 0.1 to 2% by weight based on the binding agents, wherein a concrete of great mechanical strength and high chemical resistance is formed without the need for heating at a high temperature.

In this object of the invention the expression binding agents refers to slag and activator including portland cement. The activator consisting of portland cement, an acidic component as phosphate and a basic component as MgO does not only preclude the extra step of grinding of the slag, but also compensates for the aging of the slag. It has been observed that granules of old slag, which are enclosed by a gel film are activated by the novel activator.

Earth metals oxides apart from magnesium oxide are calcium oxide, aluminum oxide, titanium oxide and zirconium oxide. The calcium oxide is present in an amount of less than 3% by weight based on the slag. Most effective is magnesium oxide, which has the best improving effect on silicates, as it enhances the compression and tensile strengths and the elasticity, reduces shrinkage and results in a nonhygroscopic product. Normally MgO can be incorporated in silicates only by melting at a high temperature, but together with phosphates, optionally in combination with sulfates, a hydraulically acting reaction is achieved with finely ground granulated basic blast-furnace slag without the need for heating at a high temperature. The best basic component of the activator is calcined magnesia (fired at about 1750° C., whereby all water and carbon dioxide have been driven off). Less suitable are MgO containing minerals, e.g. dolomite, which act more as fillers. (See Derwent's abstract No 88793 D/48.) Dolomite, $MgCa(CO_3)_2$, contains calcium, which reacts directly with phosphate forming apatite. However, as generally known, apatite is not a binder.

For some applications it is advantageous to use a combination of MgO with other earth metal oxides and/or zinc oxides, as the basic component of the activator, as mentioned above. $Al_2O_3$ has positive effects similar to those of MgO. $Al_2O_3$ improves the reactivity of the slag and the resistance of the slag to chlorides. Titanium oxide imparts resistance to acidic actions, e.g. in contaminated air (sulfur deposition), and forms resistant crystals with silica gels. $ZrO_2$ gives a reliable security against alkaline attack. $ZnO_2$ has a similar action as MgO. Preferably MgO is used alone or in combination with aluminum oxide, titanium oxide, zirconium oxide and/or zinc oxide.

Furthermore, it was found that the activation of the slag could be more effective, if a further component as a surface tension reducing agent is added which reduces surface tension, disperses and prevents lump formation. Surface tension reducing agents are detergents such as complexed polyphosphates; nitrates such as dicyandiamide; alcoholates such as glycol and glycerin; oils; cellulose derivates and sulfates. Preferably the surface tension reducing agent is present in an amount of 0.1–2% by weight of the slag. A phosphate having surface tension reducing action such as sodium tripolyphosphate will act both as an acidic component and a surface reducing agent. Accordingly the addition of a surface tension reducing agent depends on the phosphate included. Further, sodium tripolyphosphate can be added in admixture with other phosphates or a strongly acting sulfate. An example of a strongly acting sulfate is sodium bisulfate, $NaHSO_4$, which on account of its strongly acidic reaction often replaces sulfuric acid in the industry. The combination of MgO and phosphate is hitherto known mostly from the manufacture of refractory ceramics but will also result in an improved fire-resistance of the activated blast-furnace slag. It can be mentioned that MgO and phosphate per se, do not react with slag and water, only the combination of MgO and phosphate is reactive.

The compressive strength can be further improved by the addition of amorphous silicic acid, e.g. in the form of the filtered residual product from electrometallurgical processes (such as silicon ferrosilicon or silicon chrome manufacture), having an $SiO_2$ content between 75 and close to 100% and usually a specific area of at least 20 $m^2/g$, so called silica fume or silica. Fly ash having a similar reaction as silica fume can be used in the methods of the invention. But the composition of fly ash is not exactly similar to silica fume; fly ash contains some carbon causing blowing (expansion). The bigger size of the grain also influences the density of concrete negatively. Fly ash is a residual product from coal heated power plants. The composition varies depending on the source. Good qualities can replace the filtered silica from the silica manufacture. Referring to amorphous silica the inventor's U.S. Pat. No. 4,087,285 is incorporated herein by reference. The silicic acid is preferably admixed in combination with platicizing agents.

The amorphous silicic acid is preferably present in an amount of 0.6 to 3% weight, based on the dry concrete or 4 to 20% by weight, based on the binding agents.

Further the water binding ratio (w/b) of portland cement must usually be at least 0.45 to give the cement mortar a suitable fluidity. In the methods of the invention the water binding ration (w/b) of the mortar can be decreased to about 0.30–0.35 without any negative actions on the fluidity of the mortar. The w/b value is reflected in the examples by the water content of the mortar.

The novel building material is denser than portland cement concrete and therefore more resistant to penetrating water, oxygen or $CO_2$, also resulting in an improved adherence to the steel reinforcement. The new concrete is brighter in colour and lighter in weight than portland cement concrete. The new concrete can also be used as a plaster or porous or light-weight concrete, if a pore-forming agent or light-weight aggregate of the type of perlite, or vermiculite or heat expanded porous clay pellets are added. The light-weight aggregate can be included in an amount of about 10–60% by weight, depending on the intended use of the concrete. Further it is possible to mix the concrete with steel, glass, mineral or plastic fiber reinforcement in an amount of about 5% by weight. A combination with bitumen (asphalt) is also possible.

Further it is possible to use other, known admixtures for concrete, as surface tension reducing agents, plasticisers e.g. lignosulfonate, melamine, naphthaleneformaldehyde, sodium gluconate or the like. There are many well known actions, which can be applied for controlling the time of setting of concrete. For example a finer grinding of the components and/or a high temperature of about 50° to 80° C. during the initial setting can be applied, if a short setting time is required. But the activation method by alkalies mostly used today is already too rapid, therefore the above actions for controlling the time of setting could not be used for said method, but these actions are suitable in combination with the methods of the invention. Neither are these actions suitable for the prior activation of slag by portland cement alone, because the activator $Ca(OH)_2$ is not formed from the beginning of the hydration, but not until one day later.

A retardation of the time of setting is possible by admixtures of sulfates or Plaster of Paris. But the prior known activation by alkalies requires a great amount of admixtures resulting in damaging expansion of the produced concrete. In the method according to the invention an addition of Plaster of Paris or anhydrite in an amount of about 3% by weight based on the binding agents in suitable. Thus, it will be possible to obtain a binding agent which will harden within half an hour for prefabricated concrete elements, whereby more precast units can be made per day, or it will be possible to increase the setting time to about 2.5 hours which will be necessary for casting on a building site.

The reaction rae can further be increased by mixing calcined magnesia (fired at 1750° C.) with caustic magnesia (fired at 1250° C.) in an amount up to about 50% by weight of the total amount of magnesia. A similar effect can be achieved by mixing sodium tripolyphosphate with a small amount of ammonium dihydrogenphosphate as shown in the examples. The latter phosphate sets too rapidly and said phosphate can only be presented in a maximum amount of 6% by weight based on the total amount of phosphates. An outlined above the novel building material has a lower calcium content than portland cement. The detrimental excess of $Ca(OH)_2$ in conventional concrete is limited in the present invention to an amount of calcium useful for the hydration reaction of the binder. The calcium content of the activator should not exceed 3% by weight based on the slag.

Furthermore, for some applications an addition of fluorides into the slag is suitable. Preferably the fluorides can be added in an amount of 1 to 5% by weight based on the binding agents. The new concrete may also be combined with bitumen (asphalt) for road pavings.

The advantage of the slag concrete formed according to the present invention as compared to common portland cement concrete is higher compressive and tensile strengths, as seen from the following examples and tables. This includes both a higher early strength which enables removal of mounds in building sites already after about 10 hours for wall mouldings and after about 16 hours for vault mouldings, resulting in economic advantages, and also an increasing late strength for several months; as compared with conventional concrete wherein maximum values are reached after about 28 days.

As compared to portland cement concrete the novel concrete achieves the following advantages, for example:

1. Higher mechanical resistance, i.e. higher compressive and tensile strengths.
2. Higher chemical resistance.
3. No carbonation, i.e. precipitation of unbound lime, which may result in deterioration of the concrete.

4. No salt attack. A road paving will not be damaged by road salt. A longer life time for concrete bridges. Possibility of making resistant concrete boats.

5. Not alkaline in spite of pH 12. No unbound lime, wherefore reinforcement by glass fibres is possible. (If desired, a special type with $ZrO_2$ may be manufactured.)

6. Lighter than portland cement concrete and therefore structure may be made thinner.

7. The possibility of making thinner layers or thickness makes the construction cheaper, apart from the fact that slag is cheaper than portland cement.

8. Much denser.

9. Better adherence to steel and better protection against rusting of the steel adhered to the concrete.

10. Higher refractoriness (fire resistance).

11. High frost-proof.

12. Facilitates casting in cold weather.

13. Better material than cement mortar for plastering, because of an improved adherance to concrete.

14. Lower requirements for moist curing of newly placed concrete.

15. Similar to usual concrete, the new material may be rendered porous to obtain a light-weight concrete. This material has great advantages as compared to traditional porous concrete and light-weight concrete, since the cell structure is mechanically stronger and the new material is not hygroscopic.

16. Lighter colour.

EXAMPLES

EXAMPLE 1

Finely Ground Granulated Blast-Furnace Slag Activated by an Activator Consisting of Phosphate and Magnesium Oxide Four different mortar mixtures were cast to concrete prismas of the size 40×40×160 mm. The prismas were stored in tempered water of 20+2° C. until testing. The ground granulated blast-furnace slag had a fineness of 7,500 Blaine. Magnesium oxide can be used in the form of heavy dead burned magnesia (calcinated magnesia, fired at 1750° C.) or in the form of light hydraulic magnesia (fired at 1200° C.), or a mixture of light and heavy magnesia. Heavy magnesia (calcinated magnesia) was used in the following experiments. Table 1 below shows the composition of mortars of ground granulated blast-furnace slag as main component, activated by sodium-tripolyphosphate (STPP) and heavy magnesia. The figures are parts by weight.

TABLE 1

| Mixture No | Slag fineness 7500 Blaine | MgO | STPP | Sand | Water |
|---|---|---|---|---|---|
| 1 | 100 | 3.8 | 5 | 326 | 40 |
| 2 | 100 | 7.5 | 10 | 353 | 40 |
| 3 | 100 | 7.5 | 10 | 353 | 50 |
| 4 | 100 | 10 | 10 | 360 | 50 |

Results

Table 2 shows the results of bulk density, tensile and compressive strength at the age of 1, 7 and 28 days. The tensile strength figures show the medium values of 2 tests, for compressive strength of 3 tests. Mortar number 2 gives the best result.

TABLE 2

Bulk density, tensile strength and compressive strength with normal storing, 1 day in moulds and then in water until testing.

| Age | Mortar mixture No | | | |
|---|---|---|---|---|
| | 1 | 2 | 3 | 4 |
| 1 day | | | | |
| Bulk density (kg/m³) | 2165 | 2200 | 2175 | 2185 |
| Tensile strength (MPa) | 0.4 | 1.2 | 0.7 | 0.8 |
| Compressive strength (MPa) | 1.5 | 6.2 | 3.0 | 3.5 |
| 7 days | | | | |
| Bulk density (kg/m³) | 2245 | 2255 | 2225 | 2260 |
| Tensile strength (MPa) | 3.8 | 6.3 | 4.5 | 4.6 |
| Compressive strength (MPa) | 26.1 | 40.9 | 32.8 | 33.1 |
| 28 days | | | | |
| Bulk density (kg/m³) | 2275 | 2270 | 2255 | 2265 |
| Tensile strength (MPa) | 8.7 | 10.4 | 8.7 | 8.9 |
| Compressive strength (MPa) | 57.5 | 81.3 | 67.2 | 70.7 |

A comparative test of portland cement was performed. After 28 days this test showed a compressive strength of 49.0 MPa and a tensile strength of 7.9 MPa.

Table 3 shows bulk density, tensile and compressive strength of mortar mixture 3 after heat treatment in curing chamber. The curing cycle comprises a holding period of 4 h, steam-curing from 20° to 80° C. during 3 h; isothermic curing time is 15 h.

TABLE 3

Bulk density, tensile strength and compressive strength of mortar No 3 after heat treatment. Further storage in air.

| Age days | Bulk density (kg/m³) | Tensile strength (MPa) | Compressive strength (MPa) |
|---|---|---|---|
| 1 | 2220 | 6.7 | 51.5 |
| 7 | 2185 | 7.5 | 55.8 |
| 28 | 2135 | 8.1 | 57.0 |

EXAMPLE 2

A Mixture of Ground Granulated Blast-Furnace Slag Activated by an Activator Consisting of Portland Cement, Phosphate and Magnesium Oxide and/or Admixtures Different mortar mixtures were cast to concrete prismas according to example 1. The ground granulated blast-furnace slag had a fineness of 5000 Blaine.

Table 4 shows the composition of mortars of ground granulated blast-furnace slag activated by portland cement, magnesium oxide, phosphate and optional admixtures. The figures are parts by weight.

TABLE 4

| Mixture | Slag finen. 5000 Bl. | Portland cement | MgO | STPP | Admixture | Sand | Water |
|---|---|---|---|---|---|---|---|
| 1* | 100 | — | 7.5 | 10 | — | 353 | 34 |
| 2 | 80 | 20 | 7.5 | 10 | — | 353 | 30 |
| 3 | 70 | 30 | 7.5 | 10 | — | 353 | 30 |
| 4 | 80 | 20 | 7.5 | 10 | 10 $SiO_2$ | 353 | 34 |
| 5 | 80 | 20 | 7.5 | 10 | 1.2 CaO | | |

TABLE 4-continued

| Mixture | Slag finen. 5000 Bl. | Portland cement | MgO | STPP | Admixture | Sand | Water |
|---|---|---|---|---|---|---|---|
|  |  |  |  |  | 10 SiO$_2$<br>1 ligno-sulfonat |  |  |
|  |  |  |  |  | 1.2 CaO | 353 | 30 |
| 6 | 80 | 20 | 7.5 | 10 | 10 SiO$_2$<br>1 NaOH<br>0.5 NH$_4$H$_2$PO$_4$<br>1 ligno-sulfonat | 353 | 30 |

Results

Table 5 shows the results of tensile strength and compressive strength at the age of 1, 7 and 28 days.

TABLE 5

| Age | Mortar mixture No | | | | | |
|---|---|---|---|---|---|---|
|  | 1* | 2 | 3 | 4 | 5 | 6 |
| 1 day |  |  |  |  |  |  |
| tensile strength (MPa) | 0.6 | 1.1 | 0.9 | 0.9 | 1.1 | 2.3 |
| compressive strength (MPa) | 2.4 | 5.0 | 2.9 | 2.7 | 2.9 | 10.1 |
| 7 days |  |  |  |  |  |  |
| tensile strength (MPa) | 2.6 | 7.6 | 6.8 | 6.5 | 6.9 | 9.1 |
| compressive strength (MPa) | 12.6 | 31.8 | 27.8 | 40.7 | 46.4 | 58.2 |
| 28 days |  |  |  |  |  |  |
| tensile strength (MPa) | 5.9 | 8.4 | 7.2 | 6.1 | 7.5 | 9.3 |
| compressive strength (MPa) | 30.2 | 51.0 | 43.2 | 66.1 | 63.5 | 77.3 |

*Mixture No 1 comprises slag of fineness 5000 Blaine, without any addition of portland cement, i e the same composition as mixture No 2 of example 1, but the slag is not finely ground to 7500 Blaine.

Some comparative experiments (slag and portland cement without any further activators) were performed to show the action of the novel activator compared to portland cement alone. A mixture of slag: portland cement (80:20) shows a 1-day compressive strength of 0.4 and tensile strength of 0.1. A mixture of slag/portland cement (70:30) shows a 1-day compressive strength of 0.5 and tensile strength of 0.1.

Conclusion

The results given in table 2 and table 5 show that slag of fineness 5000 Blaine gives almost the same result as finely ground slag of fineness 7500 Blaine, if the slag of 5000 Blaine is mixed with the activator of example 1 and some portland cement. The novel activator and a mixture of slag: portland cement (80:20) shows better results than the novel activator and a mixture of slag: portland cement (70:30). The old activation method of slag by portland cement alone shows the opposite tendency, i.e. a mixture of slag: portland cement (70:30) is better than (80:20).

EXAMPLE 3

Ground Basic Blast-Furnace Slag Activated by an Activator Consisting of Two Different Phosphates and Magnesium Oxide a) In mixture 2 of example 1 the amount of sodium-tripolyphosphate was replaced by a mixture of 94% by weight of sodium tripolyphosphate and 6% by weight of ammonium phosphate. The result shows improvement of the strength. See further mixture 6 of example 2 and mixture 5 of example 5.

b) The acidic component of the activator, sodium-tripolyphosphate of example 1 was replaced by different phosphates, as for example ortophosphate, resulting in mixing difficulties and an irregular structure. These problems could be compensated for by addition of a small amount of surface tension reducing agent.

EXAMPLE 4

Ground Granulated Blast-Furnace Slag Activated by an Activator Consisting of Phosphate, Magnesium Oxide and Earth Metal Oxides a) The addition of ZrO$_2$ into the basic component of the activator of example 1 och 2 improves the resistance against alkaline attack.

b) The addition of TiO$_2$ into the basic component of the activator of example 1 improves the resistance against acidic attack.

EXAMPLE 5

Ground Granulated Blast-Furnace Slag Activated by an Activator Consisting of Phosphate, Magnesium Oxide and Silica and/or Other Admixtures for Concrete An addition of silica fume or silica, in the form of the filtered residual product from electrometallurgical processes, gives further improvement to the mortars of example 1, but needs combination with a small amount of CaO and plasticizing agents, for example lignosulfate. In respect of silica fume, reference is made to the Applicant's U.S. Pat. No. 4,087,285.

Different mortar mixtures were cast to concrete prismas according to example 1. The slag had a fineness of 5000 Blaine. Table 6 shows the composition of mortars of slag, activated by magnesium oxide, phosphate, optionally portland cement and admixtures.

TABLE 6

| Mixt No | Slag | Portl cement | MgO | STPP | Admixture | Sand | Water |
|---|---|---|---|---|---|---|---|
| 1 | 100 | — | 7.5 | 10 | 1.5 CaO | 353 | 34 |
| 2 | 100 | — | 7.5 | 10 | 5 SiO$_2$<br>0.6 lignosulf | 353 | 34 |
| 3 | 100 | — | 7.5 | 10 | 10 SiO$_2$<br>0.6 lignosulf | 353 | 30 |
| 4 | 100 | — | 7.5 | 10 | 10 SiO$_2$<br>1.5 lignosulf<br>1.5 CaO | 353 | 30 |
| 5 | 80 | 20 | 7.5 | 10 | 1.2 CaO<br>1 NaOH<br>0.3 NH$_4$H$_2$PO$_4$<br>1 lignosulf | 353 | 30 |

TABLE 7

| Age | Mortar mixtures No | | | | |
|---|---|---|---|---|---|
| | 1 | 2 | 3 | 4 | 5 |
| 1 day | | | | | |
| tensile strength (MPa) | 0.7 | 0.3 | 0.7 | 2.2 | 2.6 |
| compressive strength (MPa) | 2.5 | 1.3 | 4.4 | 6.0 | 12.5 |
| 7 days | | | | | |
| tensile strength (MPa) | 3.5 | 1.3 | 2.2 | 5.0 | 10.5 |
| compressive strength (MPa) | 25.9 | 7.7 | 12.2 | 39.8 | 59.1 |
| 28 days | | | | | |
| tensile strength (MPa) | 5.5 | 3.2 | 5.1 | 8.2 | 11.2 |
| compressive strength (MPa) | 44.9 | 16.8 | 28.6 | 60.0 | 85.5 |

Conclusion

By addition of 10% by weight silica, 0.6–1.5% by weight of lignosulfonate and 1.2–1.8% by weight of CaO or Ca(OH)$_2$ the compressive strength was improved 20% compared to the results obtained in example 1 above. If the calcium content of the activator was 3% by weight, the mixture became stiff by apatite and the mortar had no binding capacity. This result showed that the calcium content of the activator had to be limited to prevent reaction between calcium and phosphate, resulting in apatite.

This experiment also showed that a calcium content of less than 3% by weight could give improvements both to slag and a mixture of slag: portland cement (80:20). According to sulfate, 3% by weight is maximum, because plaster of Paris or anhydrite is recommended as binding agent.

EXAMPLE 6

Heat Stability Test of Magnesium Oxide-Phosphate Activated Ground Granulated Blast-Furnace Slag Concrete prismas produced according to example 1 were heated to temperatures between 325° and 525° C. Prismas of the new concrete could withstand these temperatures, but prismas of portland cement cracked at 325° to 350° C. and disintegrated at 525° C. The new concrete could even withstand 1000° C. if the sand in the mixture was replaced by chamotte or olivine.

The reason for the sensitivity to high temperatures of portland cement is substantially the presence of chemically bound water. The physically bound water (capillary water) is removed at about 105° C. without any deleterious action. The chemically bound water is released later, but with cracking which will then result in decomposition.

EXAMPLE 7

Stability Tests and Results of X-Ray-Diffraction-Examination of Mortar (Concrete) with Furnace-Slag Activated by Magnesia-Phosphate The test-specimens were taken from air-stored prismas 40×40×160 mm. As testing material only the exterior parts of the pieces have been examined. These parts are supposed to have the possibility to react with carbon dioxide from the air. The testing material was ground to powder by hand in a mortar and conditioned in 50% air humidity at 20° C. The prismas were older than 1.5 years. The X-ray diffraction diagrams were analysed with regard to the presence of the below mentioned compounds: CaO, CaSO$_4$, CaCO$_3$, Mg(OH)$_2$, MgO, MgCO$_3$ Na$_3$MgP$_3$O$_{10}$12H$_2$O and Na$_2$Mg(PO$_3$)$_4$.

None of these compounds could be observed by X-ray-diffraction.

The examination proved that no carbonation has taken place. The results showed that neither calcium-nor magnesium carbonate could be found by this method.

Carbonation is a process, which occurs by reaction of carbon dioxide from the air with some hydration products from portland cement. These hydration products are first and foremost calcium hydroxide and calcium-silicate-hydrates. The quantity of calcium hydroxide, which arises during the hydration of portland cement is large, with complete hydration about 25–30% of the weight of the cement. The unstable free lime Ca(OH)$_2$ will be converted into CaCO$_3$ and H$_2$O, by CO$_2$ in the air. At the same time the released water will also attack the tri- and dicalcium silicated formed during hydration which will be converted into unstable calcium silicate hydrate. While concrete of portland cement consists of calcium-silicahydrate, which leaches out by CO$_2$ in the air, in the new concrete an absolutely stable calcium-silica-magnesia-aluminia-hydrate is formed. In addition, the alpha phase of quartz (SiO$_2$) present in the portland cement concrete will be converted into a different crystal form with increase in volume, which will also contribute to cracking (see R. K. Iler "Chemistry of Silicates"). In the combination of blast-furnace slag, phosphate and MgO there is no free lime and the SiO$_2$ of the granulated slag is amorphous, wherefore these risks are not present.

EXAMPLE 8

Salt Stability Test and Stability of pH

Concrete with a binding agent of ground granulated basic furnace slag activated by magnesiumoxide-phosphate was stored during 3 months in a 30% calcium-chloride-solution at 55° C. (The weight-proportion binder: finely ground sand was 1:1.25, and the water-binder ratio was 0.42.) The age of the concrete mixtures was 28 days at the beginning of the examination. No cracks or other decomposition processes could be observed, which occurs during storage of a concrete consisting of portland cement and sand in said calciumchloride solution.

The stability of the high pH value in the new concrete was also checked at Chalmers Institute of Technology, Sweden, by means of a bath of phenolphthalein which is a pH indicator. Permanent high pH is seen from unchanged red color which is not the case with portland cement concrete.

I claim:

1. In a method of making a building material by activation of latently hydraulic ground granulated amorphous basic blast-furnace slag having lime as one of its components to form a direct acting hydraulic binder, wherein said method comprises mixing the slag with water, sand, gravel and an activator, said slag, water, sand, gravel, and activator being present in amounts effective to enable the slag to react chemically with the water, in combination with the sand and gravel, to produce a concrete of desired strength with the slag and activator acting as binding agents, the improvement comprising forming the activator as a combination of portland cement, an acidic component and a basic component, wherein the acidic component is a phosphate or a mixture of phosphates in an amount of 2 to 40% by weight based on the amount of the binding agents, said phosphate or mixture of phosphates having surface tension reducing action or said method further comprising adding a detergent or mixture of detergents to said binding agents in an amount of 0.1 to 2% by weight of the binding agents, and wherein the basic component is present in an amount of 2 to 20% by weight based on the amount of the binding agents, said basic component being magnesium oxide, or magnesium oxide in combination with earth metal oxides selected from the group consisting of calcium oxide, aluminum oxide, titanium oxide, zirconium oxide, and zinc oxide, with the amount of calcium oxide not exceeding 3% by weight based on the slag; said portland cement being present in an amount effective to increase the mechanical strength of the building material but not exceeding 40% by weight based on the slag, and the concentration of the lime in the slag and of the calcium in the activator being such that the building material has a sufficiently low calcium content whereby substantially to preclude carbonation within said building material, said improvement causing the formation of a concrete of great mechanical strength and high chemical resistance with the magnesium oxide and phosphate or mixture of phosphates incorporated into the concrete without the need for heating at a high temperature.

2. The method as in claim 1, further comprising adding alkalies in an amount of 0.5–1.5% by weight of the binding agents.

3. The method as in claim 1, wherein the acidic component is sodium tripolyphosphate present in an amount of 2 to 40% by weight based on the binding agents.

4. The method as in claim 1, further comprising adding agents for controlling the setting period, said agents for controlling the setting period being selected from the group consisting of plaster of Paris, anhydrite and plasticizing agents, said agents being present in an amount of less than about 3% by weight based on the binding agents.

5. The method as in claim 1, further comprising adding an amorphous silicic acid in an amount of 4 to 20% by weight of the binding agents.

6. The method as in claim 1, further comprising adding a component selected from the group consisting of steel, glass, mineral and plastic fiber reinforcement in an amount of about 5% by weight.

7. The method as in claim 1, wherein the slag comprises 30–40% CaO, 35–40% $SiO_2$, 7–10% MgO, 10–20% $Al_2O_3$, 0.5–2%, $Fe_2O_3$+FeO, 1–1.5% $K_2O$+$Na_2O$ and 0.5–3% $SO_3$.

8. The method as in claim 1, wherein the building material has no unbound lime.

9. The method, as in claim 3, wherein the sodium tripolyphosphate is added in admixture with other phosphates or with a strongly acting sulfate.

10. The method as in claim 9, wherein the strongly acting sulfate is $NaHSO_4$.

11. The method as in claim 1, wherein the slag has a fineness of about 5000 Blaine.

12. The method as in claim 1, wherein the portland cement is present in an amount of 20% by weight based on the slag.

13. The method as in claim 1, wherein the portland cement is present in an amount of at least 15% by weight based on the slag.

14. The method as in claim 1, wherein the portland cement is present in an amount of between about 15 and 30% by weight based on the slag.

15. The method as in claim 1, further comprising adding material having a high porosity in an amount of 10–60% by weight to form a concrete suitable for use as a porous concrete.

* * * * *